DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 3, 1973

909 O.G. 7

T909,009

SUPERSENSITIZING DYE COMBINATION FOR ELECTROPHOTOGRAPHIC COMPOSITION AND ELEMENT

Jean Elmore Jones and William Edward Yoerger, both % Eastman Kodak Co., 1669 Lake Ave., Rochester, N.Y. 14650

Filed June 12, 1972, Ser. No. 261,881
**Int. Cl. G03g *5/06***
U.S. Cl. 96—1.6
No Drawing. 25 Pages Specification

This invention relates to supersensitizing dye combinations useful for organic photoconductive compositions comprising: at least one cyanine, merocyanine, rhodacyanine or styryl spectral sensitizing dye which (1) has an anodic polarographic half-wave potential less than +1.0 volt;
(2) has an anodic polarographic half-wave potential and a cathodic polarographic half-wave potential which, when added together, give a sum more negative than —0.10 volt; and
(3) desensitizes negative silver bromide emulsions, containing 99.35 mole percent bromide, less than 0.4 log E at a radiation of 365 nm. wherein incorporated therein at a concentration of 0.2 millimole of dye per mole of silver halide; and at least one electron-accepting dye such as a pyrylium or thiapyrylium salt as the supersensitizer.